United States Patent
Bitz et al.

[11] Patent Number: 6,146,581
[45] Date of Patent: Nov. 14, 2000

[54] METHOD OF MANUFACTURING A CERAMIC COMPONENT WITH A CERMET BODY

[75] Inventors: Guenther Bitz, Mannheim; Helmut Mayer, Wiesloch; Hans-Joachim Graf, Mannheim, all of Germany

[73] Assignees: Friatec Aktiengesellschaft, Mannheim; Krohne Messtechnik GmbH & Co. KG, Duisberg, both of Germany

[21] Appl. No.: 09/382,188

[22] Filed: Aug. 23, 1999

[30] Foreign Application Priority Data

Aug. 21, 1998 [DE] Germany .......................... 198 37 953

[51] Int. Cl.$^7$ ................................ B22F 3/12; B22F 7/02
[52] U.S. Cl. .................. 419/5; 419/10; 419/38; 264/605; 264/618; 264/617
[58] Field of Search ................... 419/5, 10, 38; 264/605, 618, 619

[56] References Cited

U.S. PATENT DOCUMENTS

| | | | |
|---|---|---|---|
| 3,706,582 | 12/1972 | Meyer | 106/39 R |
| 5,594,931 | 1/1997 | Krall et al. | 419/5 |
| 5,904,993 | 5/1999 | Takeuchi et al. | 428/627 |

FOREIGN PATENT DOCUMENTS

| | | |
|---|---|---|
| 849224 | 7/1949 | Germany . |
| 37 04 410 | 8/1987 | Germany . |
| 43 35 697 | 4/1995 | Germany . |
| 197 22 728 | 6/1998 | Germany . |

OTHER PUBLICATIONS

Kelly, "Direct Bonding of Mo and Nb Feedthroughs in Electronic-Grade A1203", *Ceramic Engineering and Science Proceedings*, vol. 3, No. 9/10, pp. 504–511 (1982).

*Primary Examiner*—Daniel J. Jenkins
*Attorney, Agent, or Firm*—Evenson, McKeown, Edwards & Lenahan, P.L.L.C.

[57] ABSTRACT

A method of manufacturing a ceramic component including at least one cermet body, especially a cermet electrode, in which the costs are reduced and the ceramic component can be produced in accordance with requirements with an integrated cermet body in a reproducible manner. The cermet body initially is produced as a green compact; the cermet body then is inserted into the ceramic composition; the ceramic composition subsequently is consolidated together with the green compact cermet body, e.g. by pressing, and the resulting assembly is finally sintered.

15 Claims, 1 Drawing Sheet

METHOD OF MANUFACTURING A CERAMIC COMPONENT WITH A CERMET BODY

BACKGROUND OF THE INVENTION

The invention relates to a method for the production of a ceramic component comprising a cermet body, especially a rod-shaped cermet electrode.

German patent no. DE 4,335,697 C2 discloses such a method, according to which, as a cermet body, a rod-shaped cermet electrode with a convex spherical shape is used, the largest diameter of which is in the center of the ceramic component and/or for which the borehole is provided with a diameter, which varies over the length and which is larger in the outlet regions of the cermet electrode than in the center of the ceramic component. In the outlet regions of the cermet electrode, a diameter difference between the latter and the borehole of between 0.05 and 0.1 mm is specified, whereas in the interior of the ceramic component the cermet electrode is in contact with the borehole wall. The cermet electrode, inserted in the borehole in this manner, is sintered together with the green compact. Under plastic deformation of the materials, the joint is formed at the places of contact between the ceramic component and the cermet electrode. By these means, a joint, which is almost stress-free and highly vacuum tight, is produced between wall of the borehole and the cermet electrode. The method requires a not inconsiderable expense. It is necessary to adhere to very tight tolerances, in order to be able to produce the low-stress but highly vacuum tight joint desired and to avoid rejects.

Furthermore, German patent application no. DE 19,722,728 A1 discloses a composite body and a method for its manufacture, the composite body consisting of a hard metal, cermet or a ceramic substrate body. From a starting powder mixture, a green compact is pre-pressed here, dewaxed and subsequently sintered in a microwave field and coated with a multi-layer coating. While still having open pores, the green compact is heated further and, at a temperature between 600° C. and 1100° C., acted upon with reaction gases and/or solids, which can be sublimed, which are required for the coating. Subsequently, the temperature is increased further and the green compact is consolidated completely by sintering, until finally the coating is applied. A composite produced in this way is said to have improved adhesion of the coating, making it useful particularly as a cutting plate for metal-cutting processing or as a high-temperature material. No prior knowledge is provided by the above about a ceramic component with a cermet body, integrated at least partially in the interior of the ceramic component, nor are those skilled in the art stimulated to produce a ceramic component with an at least partially integrated cermet body.

U.S. Pat. No. 4,769,097 (=DE 37 04 410 A1) discloses a method for fastening a rod or an electrode in a ceramic component, in accordance with which a rod is disposed in a borehole before the sintering. Within the borehole, the rod has stepped or spherical sections and has a coefficient of the thermal expansion, which is higher and than that of the ceramic component. After sintering, the rod, upon cooling, shrinks more in the radial as well as in the axial direction than does the surrounding ceramic component. By these means, the rod is clamped at the sections mentioned against the contacting regions of the ceramic component, being fixed and fastened in the ceramic component in an air-tight manner. As a result of the clamping, not inconsiderable stresses and strains develop in the contacting regions of the ceramic component. These stresses and strains may turn out to be disadvantageous, especially in the case of later force or temperature changes, and lead to cracks and finally to leaks in the joint region between the rod and the ceramic component.

SUMMARY OF THE INVENTION

Starting from the foregoing state of the art, it is an object of the invention to provide a method for manufacturing a ceramic component including a cermet body in which the cermet body is effectively integrated into the ceramic component at reduced cost.

A further object of the invention is to provide a method which enables a ceramic component which includes a cermet body to be manufactured in accordance with desired specifications in a reproducible manner.

It is also an object of the invention to provide a method which avoids excessively high stresses in the region of the joint, as well as any damage to the material and/or leaks in the joint which may result from such stresses.

Another object is to provide a method which can be carrier out with a high degree of reliability.

These and other objects are achieved by providing a method for manufacturing a ceramic component comprising at least one cermet body, the method comprising producing the cermet body as a green compact, introducing the green compact cermet body into a ceramic composition, thereafter consolidating the ceramic composition together with the green compact cermet body, and sintering the consolidated ceramic composition and green compact cermet body.

The proposed method enables the ceramic component with an integrated cermet body, which is inserted in the ceramic composition as a green compact before the consolidation and the sintering, to be produced without problems and at low cost. The green compact is pre-produced and pre-consolidated and can be introduced without problems into a mold and positioned at the desired place. Thereafter, the ceramic is subjected to a known molding method, the ceramic composition being consolidated with the cermet body. Subsequently, sintering is carried out jointly.

The ceramic composition can be present as a powder or in a form, suitable for pouring, particularly as a suspension. Especially compression molding, isostatic pressing or casting are used as molding methods. For compression molding or isostatic pressing, consolidation is accomplished by the action of the pressure during pressing. On the other hand, in the case of casting, especially in a gypsum mold or the like, the density is increased by the removal of liquid, e.g. water. Within the scope of the invention, the cermet body can be used as a green compact, particularly in the form of a pin or plate and, after sintering, particularly as an electrode.

In one preferred embodiment, the ceramic composition, as a powder, initially is partially filled in to a cavity, which corresponds at least approximately to the shape of the finished ceramic component. Subsequently, the cermet body, particularly a pin-shaped cermet electrode, is introduced, and finally the cavity is filled in the required manner with the remainder of the ceramic composition. After that, the consolidation is carried out, particularly by pressing dry, and finally the sintering. If the ceramic composition is supplied in liquid form and/or as a suspension, the cermet body advantageously is previously fixed in the desired position in the cavity of the mold with arresting means, and the ceramic composition is subsequently introduced into the cavity of the mold by casting, especially by injection molding. The above-mentioned consolidation takes place in accordance with the molding method used, the density of the ceramic composition being increased and a uniform distribution and contact at the outer surface of the cermet electrode being attained. Accordingly, before the sintering, a pre-consolidation is carried out in a first step. During the pressing, the cermet body experiences a deformation transversely to the preferred direction of action of the mold pressure. If, for example, an essentially cylindrical cermet electrode is inserted into the ceramic composition, the mold pressure acts essentially orthogonally to the longitudinal axis of the cermet electrode. By these means, the electrode can be deformed plastically during the pressing in such a way that the circular cross sectional area changes into an oval or somewhat elliptical cross sectional area, the major axis of which essentially lies orthogonally to the direction of action of the mold pressure. As noted, the cermet body is pre-molded as a green compact and pre-consolidated with the ceramic composition. During the subsequent sintering step, further consolidation of the ceramic composition and the cermet body takes place. After the ceramic component is sintered jointly with the cermet electrode, the cross-sectional area of the electrode likewise is ovalized. After the sintering, the cermet body is integrated over a significant portion of its total length in the ceramic component, a closed, tight, especially high-vacuum tight, joint surface being present over the extent of the outer surface of the cermet body. The joint surface has a specifiable length, in particular, one of essentially the same magnitude as the width of the ceramic component in which the cermet body is integrated, so that stress and strain peaks are avoided.

In an alternative embodiment, a pourable ceramic composition, especially a suspension, is introduced into a mold of plaster or the like. The green cermet body is fixed in the mold in a suitable manner. In particular, the green cermet body may be in the form of a pin-shaped cermet electrode having at least one free end inserted in the mold. Furthermore, the green cermet body is disposed in the required alignment in the cavity of the mold, thereby leaving a surrounding space in the mold cavity for accommodating the pourable ceramic composition. The ceramic composition is supplied into the mold cavity of the mold particularly by pouring and, after that, surrounds the cermet body completely in the region of the cavity. The ceramic composition is consolidated by liquid withdrawal, particularly by withdrawal of water from the cast ceramic composition. Finally, the resulting molded object, is subjected to sintering together with the integrated cermet body.

BRIEF DESCRIPTION OF THE DRAWINGS

The invention is described in greater detail with reference to an illustrative example shown in the accompanying drawings, without being limited to the example. In the drawing

DETAILED DESCRIPTION OF PREFERRED EMBODIMENTS

Figure 1:
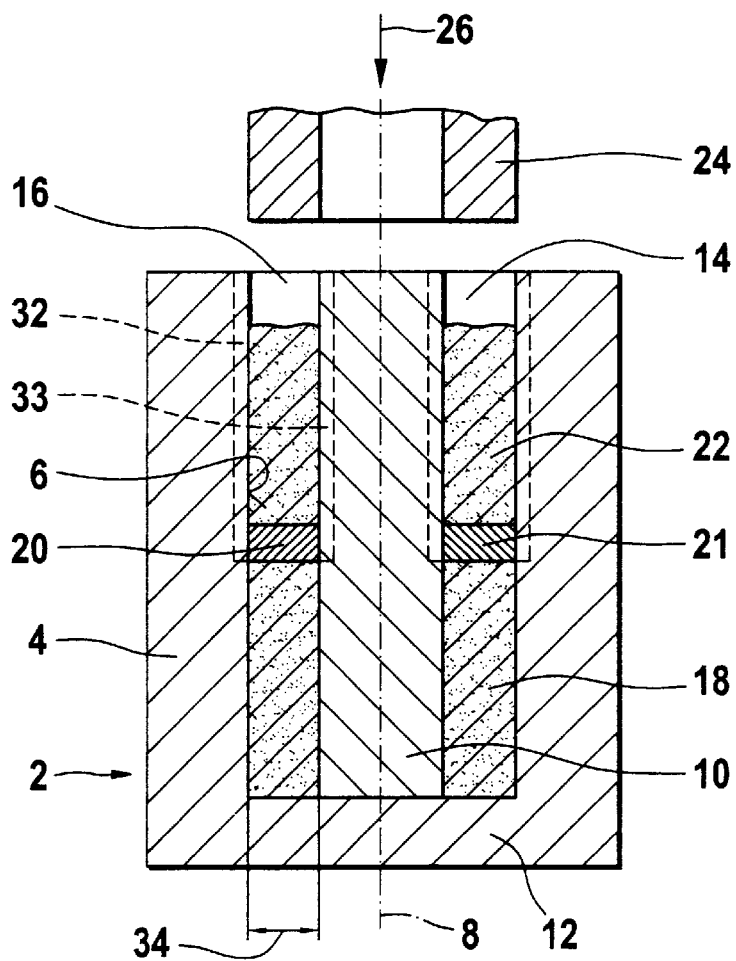
FIG. 1 is a diagrammatic view of an axial section of a mold for producing an annular ceramic component.

FIG. 1 shows a mold 2 which comprises an outer part 4 with an essentially cylindrical inner surface 6 and a central core 10, which is also disposed coaxially to the longitudinal axis 8. The outer part 4 can be constructed as a pipe or in the shape of a pot, a bottom 12 being provided at the lower end as a termination. An annular cavity 14 thus exists between the inner surface 6 and the central, preferably cylindrical, core 10.

A first portion 18 of a grainy or powdery ceramic composition is introduced into the cavity 14 through the upper annular opening 16, the longitudinal axis 8 of the mold 2 advantageously being aligned vertically. Subsequently, two cermet electrodes 20, 21 are introduced into the cavity 14 from above through the opening 16 and placed on top of the first part 18 of the ceramic composition. The two cermet electrodes 20 and 21 are preferably aligned diametrically. In this regard, it is important that these cermet electrodes 20, 21 are already constructed as green compacts and thus have an adequately stable structure and can be handled easily while being inserted in the mold 2. Furthermore, it is important that the ceramic composition and the cermet electrodes have at least approximately equal particle sizes and/or the same shrinkage behavior during sintering. The preferably cylindrical cermet electrodes 20, 21 have an essentially circular cross section and are disposed in the cavity 14 at least approximately radially with respect to the longitudinal axis 5. At most, the length of the cermet electrodes 20, 21 is equal to the radial gap width of the cavity 14. The cermet electrodes can be cut off without problems in the required length from a rod-shaped green compact. A number of cermet electrodes can be produced with little effort from the rod-shaped green compact, depending on its total length. After the accurate alignment of the cermet electrodes 20, 21, the remaining second portion 22 of the ceramic composition is introduced into the mold or its cavity 14.

In a further step of the method, the whole of the ceramic composition 18, 20 is now pressed jointly with the cermet electrodes 20, 21. Thereafter, by means of a die 24 which corresponds in shape to that of the cavity 14 and thus in the present example is shaped in the form of a ring, the consolidation of the ceramic composition 18, 22, is carried out with the required pressure. This lead to a deformation of the inserted green cermet electrodes 20 and 21 in a direction transverse to the pressing direction 28. Finally, in a last step of the method, the thusly pre-formed molded object is sintered. During the sintering, the ceramic portion of the cermet grows seamlessly together with the ceramic composition.

Figure 2:
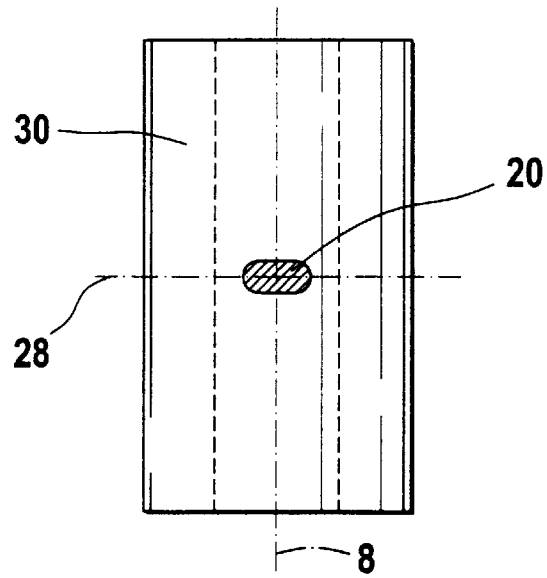
FIG. 2 is a side view of the ceramic component, rotated about its longitudinal axis by 90°.

FIG. 2 shows a view of the pressed or also of the already sintered ceramic component 30 in a position rotated through 90° from that of FIG. 1. The radially outer end surface of the cermet electrode 20 can be recognized. For reasons of clarity, the already explained deformation of the original circular cross-section into an oval or quasi elliptical shape is clearly shown. Furthermore, it can be seen that the major axis of the deformed cross-sectional surface of the cermet electrode lies essentially in a radial plane 28.

In an alternative embodiment, the shape 2 contains arresting means 32, 33, which are indicated in FIG. 1 with broken lines. These arresting means 32, 33 are disposed as longitudinal grooves in the outer part 4 and in the central core 10, which end approximately in the center of the longitudinal extent of the cavity 14. The cermet electrode 20 is placed in these longitudinal grooves 32,33, the length of the cermet electrode 20 being such that the cermet electrode 20 rests on the lower end of the longitudinal grooves 32, 33. The arresting means 32, 33 assure a defined positioning of the green compact of the cermet electrode 20, and during the subsequent filling with the ceramic composition, there is no need to fear undesired shifting of the green compact of the cermet electrode, regardless of whether the ceramic composition is a powder, a liquid or a suspension.

After the introduction of the ceramic composition into the cavity 14, the ceramic composition surrounds the green compact of the cermet electrode over the whole circumference and, moreover, over a length, corresponding to the width 34 of the cavity 14. After the sintering, the cermet electrode, corresponding to the width 34, is integrated essentially over its whole length as well as over its whole circumference firmly and tightly in the ceramic body. Accordingly, there is a tight joint area, which is closed over the circumference and the length of which corresponds to the width 34 of the cavity 14 and/or essentially to the whole length of the cermet electrode.

In the method of the invention, expensive preparations, such as drilling a pre-shaped ceramic body or the particularly lumpy formation of the inner surface of the borehole or of the outer surface of the cermet electrode in accordance with the German patent mentioned above, are all omitted. There are no special manufacturing tolerances, either during the manufacture of the cermet body or of a borehole in an already consolidated ceramic molded body. The materials of the ceramic composition, on the one hand, and of the cermet body, on the other, are matched to one another pursuant to the invention in such a manner, that at least approximately equal predominant particle sizes and/or equal shrinkage behavior is attained during the sintering.

The invention is not limited to the described manufacture of a ring-shaped or annular ceramic component. Rather, flat ceramic components or three-dimensional components of any contour, with integrated cermet bodies, especially cermet electrodes, can also be manufactured without problems in accordance with the inventive method.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A method for manufacturing a ceramic component comprising at least one cermet body, said method comprising the steps of:
   producing the cermet body as a green compact;
   introducing the green compact cermet body into a ceramic composition;
   thereafter consolidating the ceramic composition together with the green compact cermet body; and
   sintering the consolidated ceramic composition and green compact cermet body;
   wherein the cermet body is a cermet electrode.

2. A method for manufacturing a ceramic component comprising at least one cermet body, said method comprising the steps of:
   producing the cermet body as a green compact;
   introducing the green compact cermet body into a ceramic composition;
   thereafter consolidating the ceramic composition together with the green compact cermet body; and
   sintering the consolidated ceramic composition and green compact cermet body,
      wherein said introducing step is carried out by partly filling a mold cavity with the ceramic composition; disposing the green compact cermet body on the ceramic composition in the partly filled mold cavity, and thereafter filling the remainder of the mold cavity with the ceramic composition prior to said consolidating step, whereby the cermet body is integrated into a molded ceramic body.

3. A method for manufacturing a ceramic component comprising at least one cermet body, said method comprising the steps of:
   producing the cermet body as a green compact;
   introducing the green compact cermet body into a ceramic composition;
   thereafter consolidating the ceramic composition together with the green compact cermet body; and
   sintering the consolidated ceramic composition and green compact cermet body,
      wherein said introducing step is carried out by: arranging the cermet body in a mold cavity such that the cermet body is at least partially disposed in the mold cavity; thereafter supplying the ceramic composition into the mold cavity such that at least that part of the cermet body which is disposed in the mold cavity is enclosed by the ceramic composition.

4. A method according to claim 3, wherein the ceramic composition is poured into the mold cavity.

5. A method according to claim 3, wherein the ceramic composition and green compact cermet body are consolidated by removing liquid from the ceramic composition.

6. A method for manufacturing a ceramic component comprising at least one cermet body, said method comprising the steps of:
   producing the cermet body as a green compact;
   introducing the green compact cermet body into a ceramic composition;
   thereafter consolidating the ceramic composition together with the green compact cermet body; and
   sintering the consolidated ceramic composition and green compact cermet body,
      wherein the ceramic composition and green compact cermet body are consolidated by compressing them together.

7. A method according to claim 6, wherein said compressing is effected by pressing in a pressing direction, and during said pressing, the cermet body in the ceramic composition is deformed transversely to said pressing direction.

8. A method according to claim 7, wherein during said pressing, the external dimensions of the green compact cermet body are decreased in the pressing direction and increased transversely to the pressing direction.

9. A method according to claim 7, wherein said green compact cermet body has a circular cross sectional configuration prior to said pressing and an oval cross sectional configuration after said pressing, the oval having a major axis extending essentially orthogonally to the pressing direction.

10. A method according to claim 2, wherein said green compact cermet body is composed of particles having a predominant particle size substantially corresponding to the predominant particle size of the ceramic composition.

11. A method according to claim 2, wherein the green compact cermet body is composed of a composition having a shrinkage during sintering which is approximately the same as the shrinkage of the ceramic material during sintering.

12. A method according to claim 3, wherein said green compact cermet body is composed of particles having a predominant particle size substantially corresponding to the predominant particle size of the ceramic composition.

13. A method according to claim 3, wherein the green compact cermet body is composed of a composition having a shrinkage during sintering which is approximately the same as the shrinkage of the ceramic material during sintering.

14. A method for manufacturing a ceramic component from a ceramic material, said ceramic component having at least one cermet body integrated therein, said method comprising the steps of:

producing the cermet body as a green compact from a material having a shrinkage during sintering which is approximately the same as the shrinkage of the ceramic material during sintering;

partially filling a hollow molding chamber of a mold with the ceramic material;

disposing the green compact cermet body on the ceramic material in the partially filled molding chamber;

thereafter filling the remainder of the molding chamber with the ceramic material;

compressing the ceramic material in the molding chamber, whereby the green compact cermet body is enclosed within the ceramic material; and sintering the ceramic material with the cermet body enclosed therein.

15. A method for manufacturing a ceramic component from a ceramic material, said ceramic component having at least one cermet body integrated therein, said method comprising the steps of:

producing the cermet body as a green compact from a material having a shrinkage during sintering which is approximately the same as the shrinkage of the ceramic material during sintering;

disposing the green compact cermet body at least partially within a hollow molding chamber of a mold;

introducing the ceramic material into the molding chamber, whereby the at least a part of the cermet body within the molding chamber is enclosed by ceramic material;

compressing the ceramic material in the molding chamber with the cermet body at least partially enclosed therein; and sintering the ceramic material with the cermet body at least partially enclosed therein.

* * * * *